Figure 3:
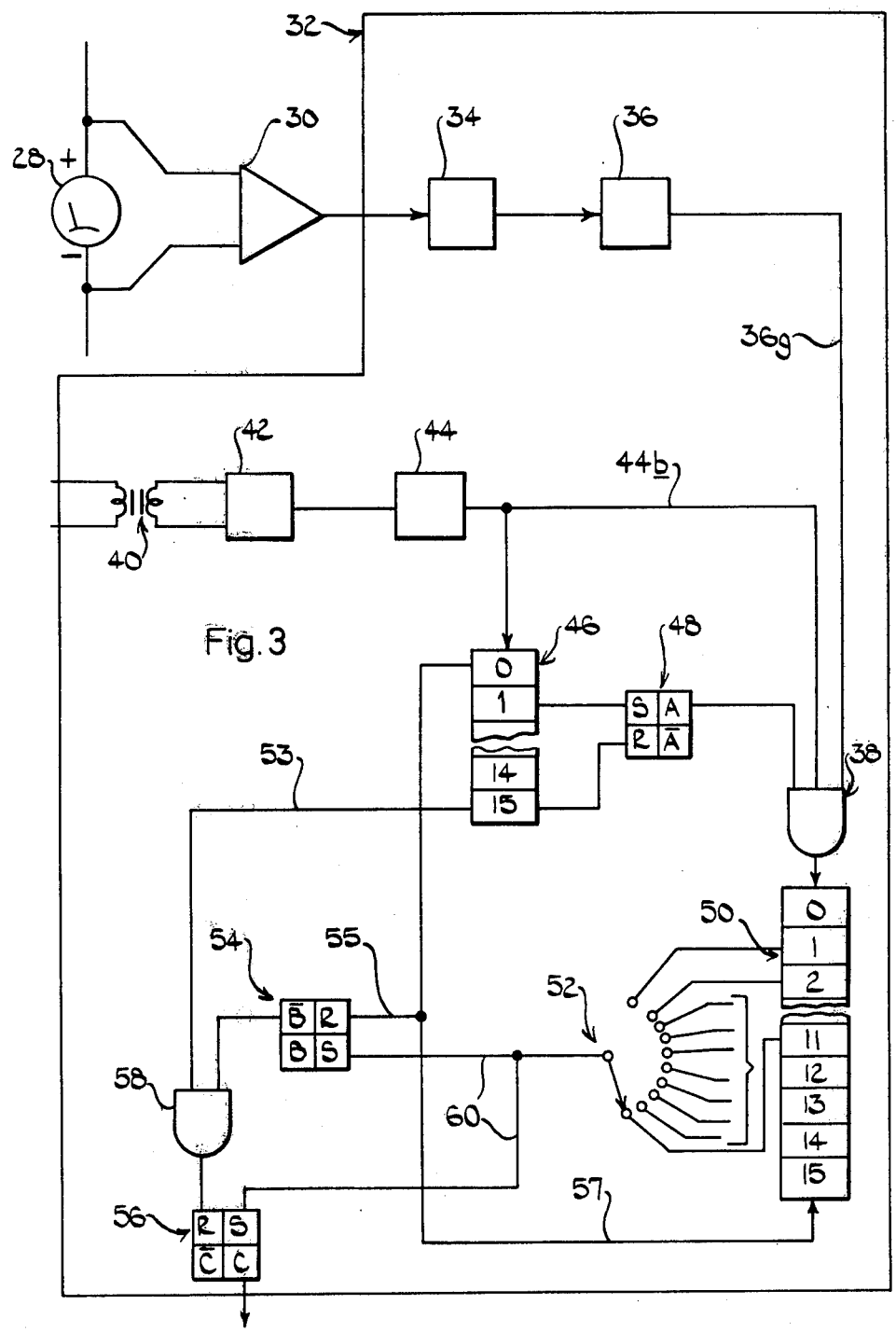

United States Patent [19]

Greenwood

[11] 4,160,710
[45] Jul. 10, 1979

[54] METHOD OF ELECTROLYTIC MACHINING

[75] Inventor: Stanley W. Greenwood, Colne, England

[73] Assignee: Rolls-Royce Limited, London, England

[21] Appl. No.: 902,747

[22] Filed: May 3, 1978

[30] Foreign Application Priority Data

May 6, 1977 [GB] United Kingdom ............... 19008/77

[51] Int. Cl.² .......................... B23P 1/00; B23P 1/04; B23P 1/14
[52] U.S. Cl. .......................... 204/129.25; 204/129.43; 204/129.7; 204/DIG. 9; 204/225
[58] Field of Search ...................... 204/129.25, 129.43, 204/129.7, DIG. 9, 225

[56] References Cited

U.S. PATENT DOCUMENTS

| 3,607,689 | 9/1971 | Inoue | 204/129.43 |
| 3,616,346 | 10/1971 | Inoue | 204/129.25 X |
| 3,859,186 | 1/1975 | Ullmann et al. | 204/129.25 |
| 3,883,793 | 5/1975 | Mizuhara et al. | 204/129.25 X |

FOREIGN PATENT DOCUMENTS

| 41-20205 | 11/1966 | Japan | 204/129.25 |
| 1093932 | 12/1967 | United Kingdom | 204/129.25 |
| 457573 | 2/1975 | U.S.S.R. | 204/129.25 |

Primary Examiner—John H. Mack
Assistant Examiner—D. R. Valentine
Attorney, Agent, or Firm—Cushman, Darby & Cushman

[57] ABSTRACT

The operation of an electrolytic machine tool is monitored over equal periods of time, so as to detect the number of short circuits, if any, which occur. Where a given number of short circuits are detected in any one time period, a signal is derived from the last of that number and utilised to switch off the electrode traverse motor through power and electrolyte flow are maintained to enable sludge clearance and observation of the resultant reduction in short circuits.

6 Claims, 6 Drawing Figures

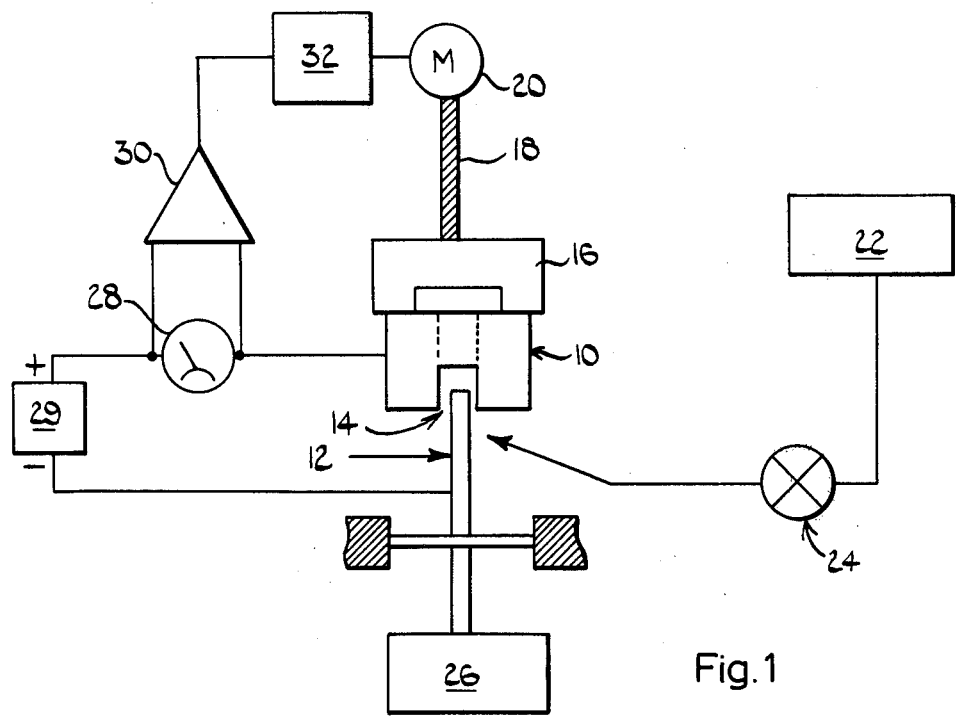
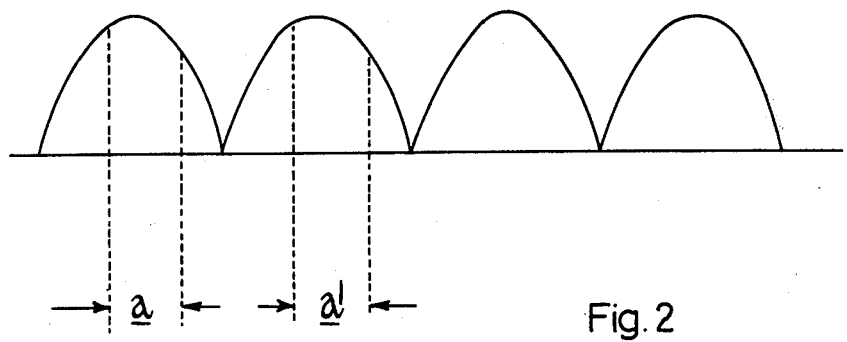

METHOD OF ELECTROLYTIC MACHINING

This invention concerns electrolytic machining.

In particular the invention is concerned with solving the problems created by short circuiting which occurs between the workpiece and machining electrode when sludge builds up in a hole being drilled by the electrolytic machining process. The problems are welding together of workpiece and electrode and time wasting.

Prior art methods comprise vibrating the workpiece or electrode whilst machining is taking place, so as to prevent settling of the sludge, thus making it easier to flush away the sludge.

The drawback is that the prior art method is not entirely successful, for it merely increases the time period which passes before short circuiting occurs again and does not improve the speed of detection of short circuits which do occur, sufficiently rapidly for suitable action to be taken to avoid damage.

The object of the present invention is to provide a method whereby the occurrence of short circuits can be immediately detected and eliminated before welding of workpiece and electrode occurs.

A further object of the present invention is to provide apparatus with which to carry such a method into effect. Thus the invention comprises a method of electrolytically machining a workpiece with an electrode comprising the steps of applying a pulsed voltage between the workpiece and the electrode such that machining current passes in discrete pulses during normal machining, monitoring the machining current to detect current flow in the spaces intervening the pulses, which current flow consists of a short circuit and, on detecting such current flow in a given number of intervening spaces within a given time period, stopping movement of the electrode towards the workpiece and continuously delivering electrolyte to the workpiece so as to wash sludge away from between the workpiece and the electrode.

The invention further provides apparatus for performing the method comprising an electrolytic machine tool having machining current flow monitoring means, further pulse producing means adapted for production of further pulses in alternating manner with the normal machining pulses, an AND gate connected to receive signals representing machining current flow from said monitoring means and the pulses from the further pulse producing means and adapted to emit a pulse each time it simultaneously receives machining current flow signals and a further pulse, counting means for counting a given number of pulses emitted over a given time period by the AND gate and adapted such that on receipt of the last of said given number of pulses, it emits a signal to stop movement of the machine tool electrode towards a workpiece being machined.

Figure 4:
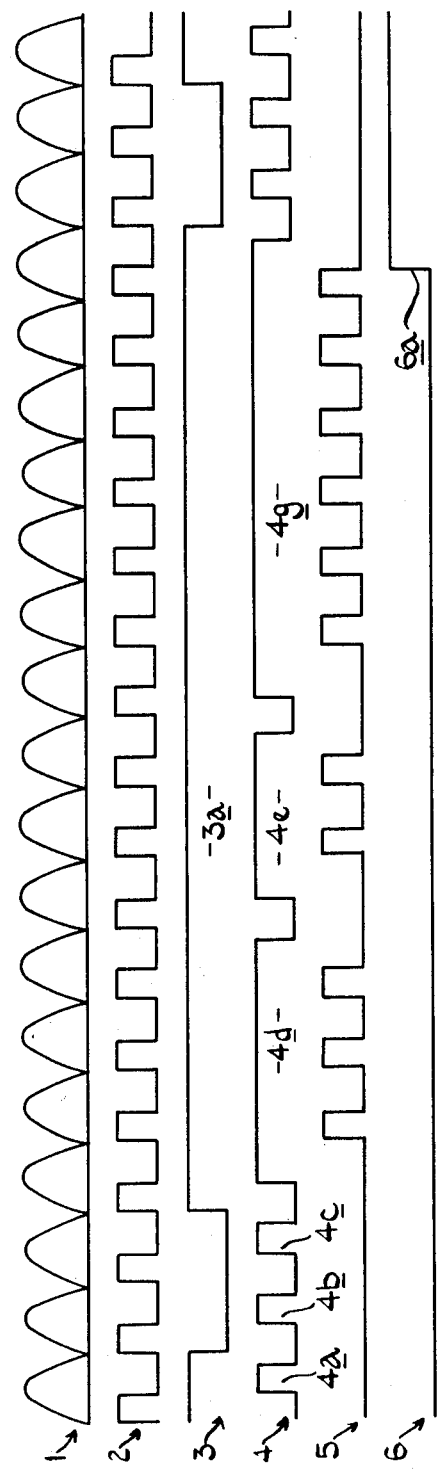
Figure 5:
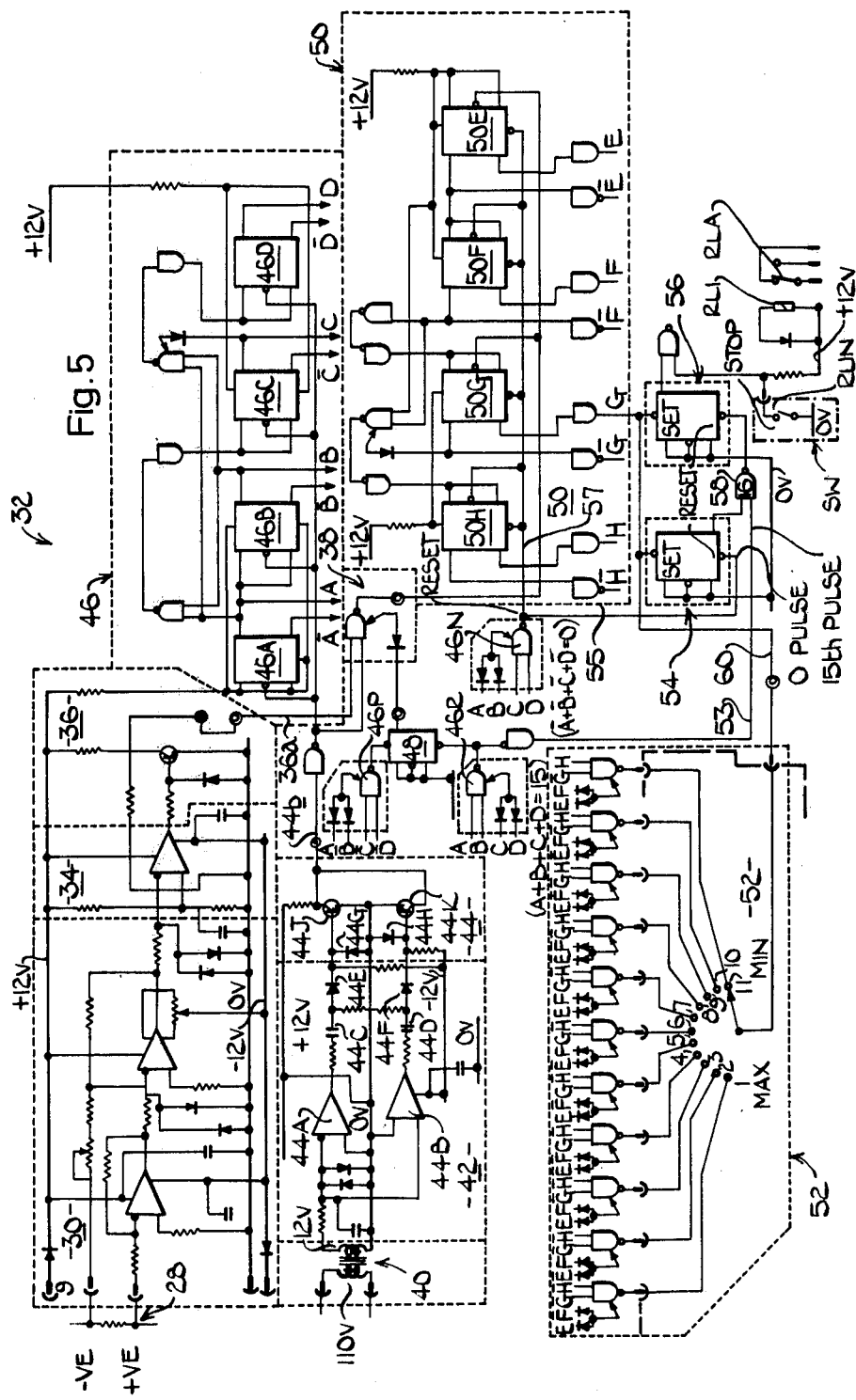
Figure 6:
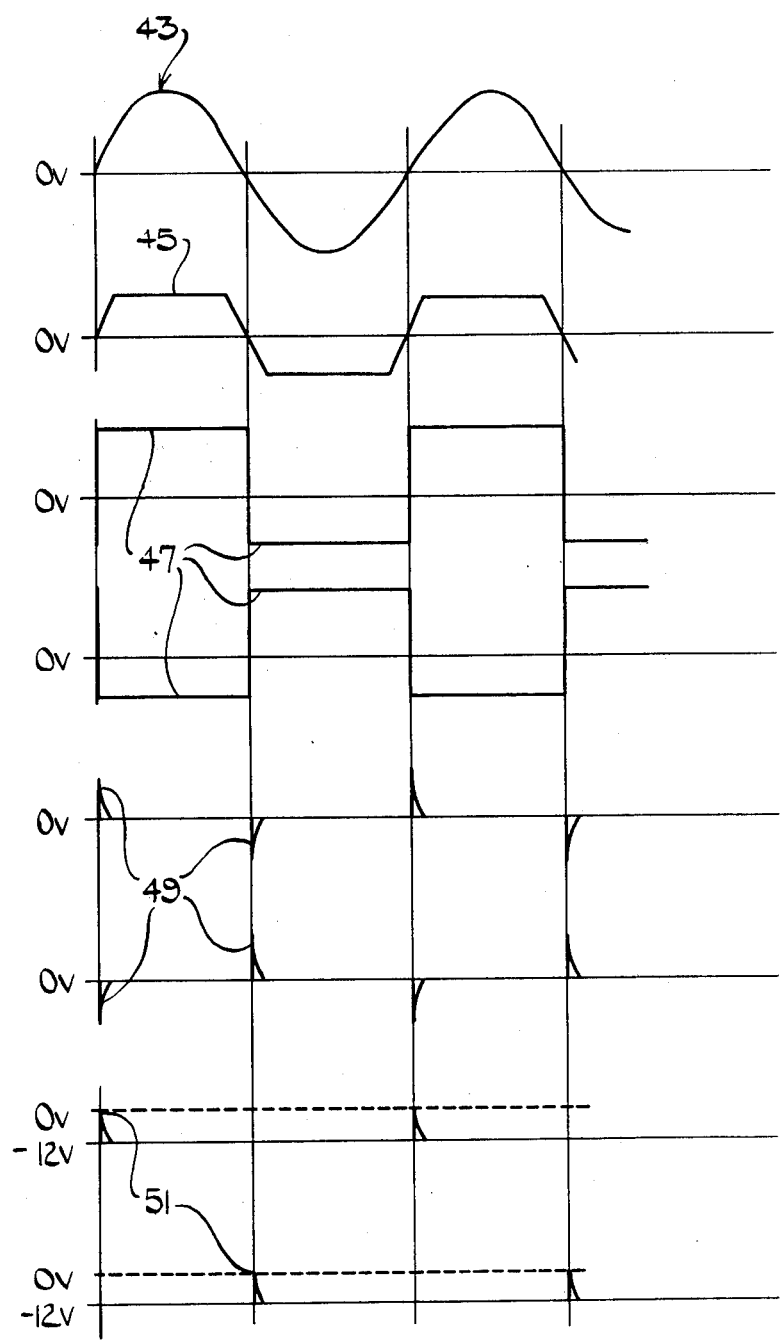

The invention will now be described by way of example, with reference to the accompanying drawings in which:

FIG. 1 is a diagrammatic view of an electrolytic machine tool and workpiece,
FIG. 2 is a voltage wave form diagram,
FIG. 3 is a circuit block diagram,
FIG. 4 is a composite pulse form diagram,
FIG. 5 is a circuit diagram, and
FIG. 6 is a further composite pulse form diagram.

In FIG. 1 a workpiece 10 and an electrode 12 are positioned so that the electrode 12 can be caused to bore a hole 14 in the workpiece by the known process of electrolytic machining.

Workpiece 10 is mounted on a slide 16 which with the workpiece, is moved by a screwed shaft 18 towards the electrode 12 in order to maintain a substantially constant gap between the tip of electrode 12 and the inner end of hole 14 whilst material is being removed. Shaft 18 is driven by a motor 20.

Electrolyte is directed into hole 14 for the purpose of providing conduction of electric current between the electrode tip and the hole inner end to achieve electrolytic machining of workpiece material. This electrolyte comprises sodium silicate which is held in a reservoir 22 and delivered to the hole 14 by a pump 24. The flow of sodium silicate also flushes away the resulting sludge. Further, to assist sludge removal, electrode 12 is rapidly reciprocated towards and away from workpiece 10, axially of itself by a vibratory mechanism 26 so that any sludge present is constantly agitated, thus making it easier for the sodium silicate to flush it from the hole.

Despite the reciprocation of electrode 12, sludge build up still occurs from time to time with the result that the gap between electrode tip and hole inner end is then mechanically bridged with consequent short circuiting between workpiece 10 and electrode 12. If this is allowed to continue, excessive electrical current passes which generates sufficient heat eventually to weld electrode and workpiece together. If this occurs, the workpiece is unusable and has to be scrapped and the electrode also has to be replaced.

Referring now to FIG. 2, the voltage wave form supplied to the electrical system is shown and it can be seen to be of alternating form which has been fully rectified to provide half wave pulses at a frequency of 100 pulses per second.

During normal operation without short-circuiting, machining current flows only during that period of time which embraces peak voltage, as indicated at a in FIG. 2 and at 4a to 4d in FIG. 4. Electrode 12 is reciprocated at 100 cycles per second and its movement is synchronised with the half wave pulses of machining voltage so that the electrode is nearest the inner end of the hole 14 during each period a (FIG. 2) when current conduction is desired for machining. If any current flows between the end of a first period a and the start of the next period a' (FIG. 2), it is an indication that a short circuit is occurring. The timescale to which this is happening is of the order of milliseconds. Apparatus is provided to detect and ameliorate the effects of short circuits and this is diagrammatically shown as a block 32 in FIGS. 1 and 3. Apparatus 32 receives a signal related to the machining current, from a differential amplifier 30. Amplifier 30 bridges an ammeter 28 (FIGS. 1 and 3) which is connected between the power input 29 (FIG. 1) and workpiece 10.

The amplifier 30 responds to the very small voltage drop generated across ammeter 28. When machining current flows and is sensed by amplifier 30, it causes pulses to be generated in a Schmitt trigger 34 (FIG. 3) and passed via a logic level converter 36 to an AND gate 38. These pulses are equal and of a few milliseconds duration when machining is proceeding normally (as at 4a to 4c) but they become unequal when short circuiting occurs (as at 4d, 4e, 4g) as a result of the erratic occurrence of sludge bridging the gap between the electrode and hole inner end.

Apparatus 30 also includes a mains supply transformer 40, mains alternating current wave zero crossing detector 42, monostable pulse generator and further logic level converter 44, all connected in series, to provide pulses of four milliseconds duration, which are produced between the end of one machining pulse and the start of the next machining pulse. The wave form of these pulses is shown at 2 in FIG. 4. These pulses pass to AND gate 38 and to a four stage binary counter 46 which, during operation of the machine, runs continuously through its sixteen states "0" to "15".

State "1" of binary counter 46 sets a bistable 48 and state "15" thereof resets bistable 48, so that the bistable 48 provides a gate wave form comprising pulses of one hundred and forty milliseconds duration, at intervals of twenty milliseconds, as is indicated at 3 in FIG. 4. The long pulses 3a comprise sampling periods during which the machining operation is monitored for the presence of a short circuit. Pulses 3 are fed to AND gate 38 along with pulse trains 2 and 4 (FIG. 4).

AND gate 38 is arranged to pass an output only on simultaneous receipt of positive going signals 2, 3 and 4. Such simultaneous receipt only happens when short circuiting is occurring in the machining circuit. The signal output from AND gate 38, shown at 5 in FIG. 4 is directed to a second, four stage binary counter 50. Counter 50 counts the number of pulses received from AND gate 38 during any one sampling period 3a. If this count reaches "11", bistable 54 and a bistable 56 are set via switch 52 and a signal 6a is generated by bistable 56 and indicated in wave form 6 of FIG. 4. This stops the workpiece traverse motor 20 (FIG. 1).

Electrode 12 and workpiece 10 are then stationary except for the vibration applied to electrode 12 as described above. Electrical power input is maintained with the result that the short circuit still occurs, due to the build up of sludge in hole 14. However electrolyte is being pumped into hole 14 and this gradually flushes away the sludge thus gradually removing the cause of the short circuit.

Workpiece traverse motor 20 remains de-energised until the short circuit is cleared. The continued presence of the short circuit will cause signal 4 to be continuous (as at 4e) and for pulses 5 to continue to be detected at counter 50 during successive sampling periods 3a. However, when the short circuit is cleared pulses 5 will disappear and motor 20 will be re-energised as soon as the next sampling period 3a has been completed without the counter 50 counting eleven pulses 5.

The continued presence of a short circuit maintains de-energisation of motor 20 in the following way. During each sampling period 3a, pulses 5 will be detected on counter 50, and when eleven such pulses have been counted a signal generated on line 60 causes bistable 54 and bistable 56 to be set and bistable 56, when set, inhibits energisation of motor 20.

When the short circuit has cleared either completely or sufficiently that less than eleven pulses 5 are counted on counter 50 during a sampling period the motor 20 is re-energised in the following way. At the beginning of each sampling period the "0" count of counter 46 passes a signal along line 55 to reset bistable 54 (as well as passing a signal on line 57 to clear counter 50 to "0"; this happens irrespective of whether a short circuit is present). When counter 50 counts less than eleven during a sampling period, bistable 54 will remain reset and when, at the end of the sampling period, count "15" occurs on counter 46 this sends a signal along line 53 so that AND gate 58 then simultaneously receives signals on both of its inputs and gives an output signal. This output signal resets bistable 56 thus allowing motor 20 to become re-energised. It is possible to adjust switch 52 to vary the number of pulses 5 received on counter 50 in any one sampling period before the motor 20 is stopped.

Referring now to FIG. 5, this figure shows in detail the circuitry and components depicted diagrammatically in box 32 of FIGS. 1 and 3 and those detailed parts in FIG. 5 which correspond to the respective parts in FIG. 3, have like numerals to identify them. There follows herein, a brief description of each part of the circuitry.

Amplifier 30

Amplifier 30 is of the type known as an inversion or high gain amplifier. Thus, it receives a low amplitude signal from the ammeter bridge and converts it to a signal of much greater amplitude, but of still the same kind of wave form prior to passing the signal to the Schmitt trigger 34.

Schmitt Trigger 34 and Logic Level Converter 36

Schmitt trigger 34 is a conventional device used for squaring the wave form of the pulses it receives from amplifier 30. The trigger in the particular example operates in the range $+12$ v to $-12$ volts, and is connected to the logic level converter 36 which eliminates the negative portion of the signals and emits only the positive portions, which it passes to AND gate 38 via line 36a.

Zero Crossing Detector 42

This detector includes monostable pulse generator and logic level converter 44 and derives alternating current via a transformer 40 which transforms the input at 40 from 110 v. to an output of 12 v. Converter 44 also changes the wave form of the current flow from sinusoidal, as as 43 in FIG. 6, to truncated sinusoidal, as at 45 (FIG. 6). The reduced voltage current is passed to a pair of amplifiers 44A and 44B where respective positive and negative portions of the pulses are amplified and squared as at 47 (FIG. 6). The squared pulses are then differentiated via capacitors 44C, 44D (FIG. 5) to produce pulses of the form shown at 49 (FIG. 6) which are instantaneously formed but have a relatively slow decay rate. These pulses are passed via diodes 44E, 44F (FIG. 5) to respective output transistors 44J, 44K of the logic level converter 44, whilst diodes 44G, 44H have the effect of eliminating the negative going portions of the pulses as shown at wave form 51 (FIG. 6). Thus only the positive pulses reach the transistors 44J, 44K and these are inverting transistors and are arranged to combine their outputs so as to give out one negative pulse only for each pair of positive pulses received. Each negative pulse is then passed via line 44b to binary counter 46 and AND gate 38.

Binary Counter 46

Binary counter 46 comprises four conventional bistables 46A, 46B 46C, 46D connected in series, each bistable requiring two successive signals in order to actuate the next adjacent bistable and so on until the last bistable in the line has been actuated. In this way counter 46 will count 0 to 15. When counter 46 is on "0", its outputs A, B, C, D will be low and thus $\bar{A}$, $\bar{B}$, $\bar{C}$ and $\bar{D}$ will be present at gate 46N. Thus a signal will be present at lines 55 and 57 for resetting bistable 54 and counter 50 as explained above. When counter 46 is on "1", output A will be high and outputs B, C, D will be low and thus $\bar{A}$, $\bar{B}, \bar{C}, \bar{D}$ will be present at gate 46P. In this state a signal will be delivered to set bistable 48 as explained above. When counter 46 is on "15", outputs A, B, C, D will all be high and thus A, B, C, D will be present at gate 46R. In this state a signal will be delivered to reset bistable 48 and the signal will also pass along line 53 to AND gate 58 as explained above.

AND gate 38 and Binary Counter 50

AND gate 38 is again of conventional design and is adapted for triggering on simultaneous receipt of signals from logic level converters 36 and 44 and counter 46 via bistable 48. As explained above when AND gate 38 is on it passes pulses of the form 5 in FIG. 4. These pulses are counted in counter 50. Counter 50 comprises four bistables 50E, 50F, 50G 50H connected in series. The corresponding outputs E to H and $\bar{E}$ to $\bar{H}$ are connected as shown to positions 1 to 11 of switch 52.

Bistables 55,56 and AND gate 58

The output of switch 52 passes along line 60 to bistables 54 and 56. Bistable 56 controls motor 20 through relay RLI. Activation of RLI is brought about by passing of a signal from switch 52, to bistables 54 and 56 and which sets bistable 54 and 56, as described above. When bistable device 56 is reset relay RLI is de-energised and motor 20 is re-started through contacts RLA. A main switch SW is provided for stopping and starting the motor drive.

I claim:

1. A method of electrolytically machining a workpiece with an electrode, including the steps of applying a first pulsed voltage across the workpiece and electrode so as to effect a corresponding pulsed, machining current flow, providing a second, parallel pulsed voltage of identical frequency and which alternates with said first pulsed voltage and providing a further, parallel pulsed voltage, each pulse of which is of sufficient duration to embrace the time taken to put out several of said first and second voltage pulses and, if the outputs of said first, second and further pulses coincide, developing from said coincident outputs a further pulse with which to bring about de-activation of the electrode traverse motor means, to stop forward movement of the electrode, but meanwhile maintaining machining current flow and a continuous delivery of electrolyte to the workpiece to wash sludge from between the workpiece and electrode.

2. A method of electrolytically machining a workpiece as claimed in claim 1 including the step of delivering said first, second and further pulses to an AND gate which on receiving a said coincident output gives an output pulse which is utilised to at least initiate the deactivation procedures.

3. A method of electrolytically machining a workpiece as claimed in claim 2 including the step of delaying deactivation of the electrode traverse motor until a given number of said coincident pulses have occurred in the duration of any said further pulse.

4. A method of electrolytically machining a workpiece as claimed in claim 3 including the steps of delivering the output from the AND gate to a counter to count said number of coincident pulses prior to deactivation of the electrode traverse motor.

5. A method of electrolytically machining a workpiece as claimed in claim 4, including the step of preventing reactivation of the electrode traverse motor until a said further pulse has passed, during which, a number of coincident pulses are produced, which number is lower than that required to de-activate the electrode traverse motor.

6. A method of electrolytically machining a workpiece as claimed in claim 5, including the step of delaying reactivation of the electrode traverse motor, by connecting the "RESET" side of a bistable between means for generating said further pulses and said motor and connecting said "SET" side of said bistables to coincident spark number selecting means, such that in operation further pulses enable the bistables for activation of the motor and, the achievement of a given number of coincident pulses disables the bistable for deactivation of the motor.

* * * * *